United States Patent [19]
Hayes et al.

[11] Patent Number: 5,506,888
[45] Date of Patent: Apr. 9, 1996

[54] AUXILLARY COMMUNICATION SERVICE ROUTING

[75] Inventors: John Hayes, St. Laurent, Canada; Glen H. Schmid, Dusseldorf, Germany

[73] Assignee: Telefonaktiebolaget L M Ericsson, Stockholm, Sweden

[21] Appl. No.: 268,721

[22] Filed: Jun. 30, 1994

Related U.S. Application Data

[63] Continuation of Ser. No. 677,314, Mar. 29, 1991, abandoned.

[51] Int. Cl.⁶ .......................... H04M 11/00; H04M 3/42
[52] U.S. Cl. ........................ 379/59; 379/60; 379/210; 379/211; 379/212
[58] Field of Search ..................... 379/59, 60, 67, 379/88, 210, 211, 212

[56] References Cited

U.S. PATENT DOCUMENTS

| | | | |
|---|---|---|---|
| 4,221,933 | 9/1980 | Cornell et al. | 179/6 C |
| 4,612,416 | 9/1986 | Emerson et al. | 379/88 |
| 4,790,003 | 12/1988 | Kepley et al. | 379/88 |
| 4,811,381 | 3/1989 | Woo et al. | 379/67 |
| 4,853,952 | 8/1989 | Jackmann et al. | 379/67 |
| 4,876,738 | 10/1989 | Selby | 379/60 |
| 4,893,328 | 1/1990 | Peacock | 379/88 |
| 4,930,153 | 5/1990 | Hagedorn | 379/89 |
| 5,109,400 | 4/1992 | Patsiokas et al. | 379/211 |

FOREIGN PATENT DOCUMENTS

| | | | |
|---|---|---|---|
| 81101550 | of 0000 | China. | |
| 3507058 | 9/1986 | Germany | 379/60 |
| 3827698 | 12/1989 | Germany | 379/60 |

*Primary Examiner*—Stephen Chin
*Assistant Examiner*—Vijay Shankar
*Attorney, Agent, or Firm*—Jenkens & Gilchrist

[57] ABSTRACT

A system and method for routing a call through the PSTN to an auxiliary communications services mailbox, such as voice mail, of a mobile subscriber. The call is received in the nearest exchange and routed to the exchange where the mobile subscriber is located. If the mobile subscriber, for example, does not answer, a voice mail number is used to route the call to the exchange where the voice mailbox is located.

30 Claims, 6 Drawing Sheets

AUXILLARY COMMUNICATION SERVICE ROUTING

This is a continuation of application Ser. No. 07/677,314, filed Mar. 29, 1991 now abandoned.

CROSS REFERENCE TO RELATED APPLICATION

This application contains subject matter related to copending U.S. patent application Ser. No. 07/490,480, entitled "Dynamic Allocation of Roamer Routing Numbers System and Method," filed on Mar. 8, 1990 and assigned to the assignee of the present invention Such application, including the subject matter contained therein, is hereby incorporated by reference herein.

BACKGROUND OF THE INVENTION

1. Field of the Invention

The present invention relates to cellular communication systems, and more particularly, to a method and apparatus for the routing of auxiliary communication services, such as voice mail, within such a system.

2. History of the Prior Art

Broadly speaking, the present invention involves an interrelationship between two telephone technologies, namely, cellular radio telephony and voice mail systems. The general state of the art of each of these technologies is discussed briefly below.

Cellular radio communications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length Similarly, wires connect the telephone outlet with a local switching office of the telephone company. A telephone user's movement is thus restricted not only by the length of the telephone cord, but also by the availability of an operative telephone outlet, i.e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others.

In a typical cellular radio system, the user, or the user s vehicle, carries a relatively small, wireless device which communicates with a base station and connects the user to a mobile switching center or exchange. The exchange facilitates communications between the user, other mobile stations in the system and landline parties in the public switched telephone network ("PSTN"). The interconnection of mobile telephone users ("mobile subscribers") with the PSTN requires that each mobile subscriber in the system be made available to anyone who has a telephone, whether fixed or mobile. Hence, the problem of locating a mobile subscriber moving from one area to another (a "roaming subscriber") within a wide geographic area has become of primary importance. A known solution to this problem is based on the concept of mobile registration.

Mobile registration is the process by which a mobile telephone unit becomes listed as being present in the service area of one of the mobile exchanges in a mobile telephone service network. In accordance with one early solution to the problem of locating roaming mobiles, as each mobile telephone unit enters a new area within the network, it transmits a unique identity signal which is detected by the mobile exchange associated with that area. This exchange records an indication of the presence of the mobile subscriber in its memory and then informs all of the other exchanges of the presence of the mobile within its coverage area at that particular moment. When the mobile subscriber crosses over into another area, the exchange associated with that area, upon receiving an identity signal from the mobile telephone unit, will record an indication of the mobile subscriber's presence there and then transmit the identity to all of the other exchanges together with its own identity signal, for the purpose of updating the mobile subscriber's position.

In other known solutions, a mobile subscriber s identity and position messages are sent by each exchange, whose respective areas are crossed by such mobile subscriber, to a specific center. Any exchange in the mobile network which contacts this center may receive all the information necessary for locating and making a connection to the mobile subscriber. This solution eliminates the need to advise one or more of the other mobile exchanges each time a mobile subscriber enters a new area without making or receiving a call there and thereby reduces the amount of mobile subscriber location data that must be processed by each of the mobile exchanges within the network.

In some systems, the aforementioned center may be a common national center such as that used in the mobile telephone location system disclosed in U.S. Pat. No. 4,700, 374 issued to Bini. In other systems, the center may be the exchange to which a mobile subscriber is assigned ("home exchange") or it may be a home location register ("HLR") which stores the location information of mobile subscribers. In such other systems, the mobile subscriber may preregister in an area other than the normal service and billing area ("home area") for service to be provided in the other area ("visited area") by the exchange associated with the visited area ("visited exchange"). When a roaming subscriber arrives in the visited area, the mobile subscriber is qualified to make telephone calls from there and calls which are received in the mobile subscriber's home area are forwarded to the visited area for transmission to the mobile subscriber.

Qualification of a mobile subscriber in a visited area may be automatically performed when the roaming subscriber appears in the visited area and the mobile station is switched on, e.g. when the user initiates a first telephone call. The roaming mobile subscriber automatically transmits its identification number to the visited exchange and requests roamer service. If the roaming subscriber is a visitor from a cooperating exchange, the visited exchange provides service to the roaming subscriber by allocating a temporary roamer number to it. The visited exchange also notifies the roaming subscriber's home exchange of the roaming subscriber s location in the coverage area of the visited exchange. The roaming subscriber s identification number is then entered into a list of roamers so that incoming calls to the home exchange of the roaming subscriber are forwarded to the visited exchange where the roaming subscriber is then located.

With this overview of cellular radio technology in mind, the other parent technology of the present invention, i.e., the rendition of auxiliary communication services such as voice mail, fax mail, video mail, teletex or other services will now be briefly discussed. While it should be understood that the invention contemplates the routing of various auxiliary communication services within a cellular network, the most presently common of such services, voice mail, will be used hereinafter as exemplary of the principles of the present invention. Voice mail, as is commonly understood in the art, refers to an automatic answering and message storing and forwarding system which allows a caller to leave a stored message for a specific telephone extension or to forward a message to an intended recipient. The voice mail system in essence, offers two distinct features: call answering and message forwarding. The call answering feature is typically invoked when a caller directly dials a telephone number or requests to be connected to a specific extension which is found to be busy, inoperative, nonanswering, etc. The unavailability of the called party results in the telephone call being redirected to the voice mail system call answering feature. At this juncture the call is routed to a voice mail receiving station and the caller is greeted by a prerecorded announcement message or a live telephone operator and prompted to leave a message which is stored in a "voice mailbox" assigned to the called party.

While the call answering feature of a voice mail system is geared to the convenience of the message recipient, the message forwarding feature is geared towards aiding the message originator. The message forwarding feature may be involved, for example, when a message originator calls the voice mail system by dialing an access code using a telephone station set touch-tone pad. The message originator designates one or more message recipients, who are also served by the telephone switching system, by dialing their station or directory numbers, and then dictates a voice message for delivery by the voice mail system to the designated message recipients. The voice mail system records the dialed directory numbers and places the message in the voice mailbox assigned to each of the designated message recipients. Each of the message recipients may then access the voice mail system to listen to the message, save the message for subsequent action, delete it, append comments and route the message to other message recipients, or reply and return a message to the message originator.

Several voice mail systems are commercially available. While such systems vary in features and capacity, all share, as a common core of functions, the ability to store messages for later retrieval by system users. Each user is assigned a voice mailbox and may retrieve his messages by accessing the system and then identifying his voice mailbox. In general, anyone having knowledge of the telephone numbers for the system, may leave messages, but only users having a voice mailbox may retrieve messages. To retrieve messages a user of a typical voice mail system accesses the system over the telephone lines and, after identifying himself by mailbox number, and possibly a password, hears a recorded message produced by the system advising him of the status of his mailbox, e.g., number of messages waiting, etc. The user may then listen to brief prerecorded portions of each message, commonly referred to as "headers" which further describe the message, for example, by identifying the originator. The user may then decide whether or not to listen to each message.

The desirability of providing voice mail services to mobile radiotelephone system subscribers has not been lost on cellular system operators. The economic incentives for incorporating a voice mail system into a cellular radio network are, at least, twofold. First, the cellular operator can charge each participating mobile subscriber a monthly fee for voice mail services. Second, the ability of a mobile subscriber to retrieve messages left in his absence increases the likelihood that the mobile subscriber will, after listening to a particular message, call the message originator and thereby generate additional revenues for the cellular system operator.

The use of voice mail systems in cellular radio networks has developed in line with the growth of cellular radio communications generally. Initially, a single mobile switching center in each of several large metropolitan cities provided communications services to mobile subscribers in the local area. The national cellular radio landscape, at this stage of development, consisted of dispersed pockets or islands of cellular radio networks with little or no roaming therebetween. Where desired, a voice mail system was connected to the mobile switching center which handled all the incoming and outgoing calls to and from the mobile subscribers in the local area. The voice mail equipment could be located in, or within a short distance from, the mobile switching center facilities.

As each of the local cellular radio networks expanded, one or more mobile switching centers were, of necessity, added to the local area. Provision of voice mail services to all of the mobile subscribers in the local area required either the connection of a voice mail system to each of the mobile switching centers or, alternatively, the sharing of a common voice mail system among the mobile switching centers. In the former instance, voice mail equipment was located in, or within a short distance from, each of the mobile switching centers while, in the latter instance, the voice mail equipment was centralized and dedicated trunks were used to connect the voice mail system to each of the mobile switching centers. Since the network coverage area rarely extended beyond the limits of a metropolitan area, the use of dedicated trunks did not pose any special problems.

However, with the advent of roaming service for mobile subscribers travelling between cities served by cooperating exchanges, the cost inefficiencies inherent in the traditional designs of cellular voice mail systems became pronounced. To illustrate, suppose that a mobile subscriber assigned to a mobile exchange (home exchange) in Los Angeles travels to San Francisco and is qualified to receive calls there, e.g., is registered in an exchange (visited exchange) in San Francisco. Suppose, further, that a call is placed to the mobile subscriber and received at the home exchange in Los Angeles. The home exchange determines from its data records, or from the data records of the HLR of the mobile, that the mobile subscriber has roamed and, therefore, routes the call to San Francisco. The visited exchange receives the call and pages the roaming subscriber who does not return a page response became, for example, he has turned off the mobile telephone. At this point, the call is either terminated or, if the roaming subscriber has voice mail service, the call is transferred back to the roaming subscriber's mailbox in Los Angeles.

As may be seen from this illustration, two long distance links or the equivalent of two toll calls, e.g., Los Angeles to San Francisco and San Francisco to Los Angeles, were necessary in order to connect the caller with the voice mail box of the roaming subscriber. This result is known in the art as the "trombone effect." Mobile subscribers are loathe to pay for the double charges incurred because of the trombone effect only to hear a voice mail message, for example, that the caller will call back later. Hence, a mechanism for countering the trombone effect is needed and, as discussed more fully below, is provided by the present invention. One technique for avoiding these disadvantages is the use of roamer port access for a roaming cellular subscriber in which a local number in the visited city is dialed to gain access to the cellular network there and enable the dialing of the mobile subscriber directly. However, the disadvantage of this procedure is that it requires the calling party to know precisely in which city the roaming mobile subscriber is currently roaming.

Another shortcoming of existing cellular voice mail systems relates to the interface between the mobile switching centers, on the one hand, and the voice mail equipment on the other. Typically, the voice mailboxes of mobile subscribers are connected to their home exchange, not via the PSTN, but through dedicated trunks, and are accessed by dedicated numbers rather than PSTN-recognized telephone numbers. This is primarily for reasons of economy, including the savings on the lease of telephone numbers from the local phone company. Specifically, instead of leasing two telephone numbers from the phone company, one for the mobile subscriber and another for his voice mailbox, only the mobile subscriber number is leased and a dedicated number is used for his voice mailbox.

To illustrate the operation of the typical voice mail interface, assume that a call is placed to a mobile subscriber and received at his home exchange. Assume, further, that the mobile subscriber is unavailable and that the call is directly routed to his voice mailbox which is often in the same building as the home exchange. It is common practice to define a dedicated voice mail number which consists of the mobile subscriber number and a prefix such as "*99." Thus, if the dialed mobile subscriber number is 876-5432, for example, the dedicated voice mail number will be *99/876-5432. The voice mailbox of the mobile subscriber can then be accessed by the home exchange simply by using the designation *99/876-5432.

Returning to the case of the mobile subscriber who roams from Los Angeles to San Francisco, and assuming that the mobile subscriber has voice mail service, the call will have to be routed from San Francisco back to Lee Angeles where the voice mailbox of the mobile subscriber is located. However, because, as discussed above, his voice mailbox number is a non-PSTN-recognized number, such as *99/876-5432, PSTN facilities cannot be used to transfer the call. It is possible, of course, to use dedicated trunks between Los Angeles and San Francisco and route the call therethrough, but the cost in this case would be prohibitive. Further, it may also be illegal for a cellular operator which is not duly licensed as a long distance carrier to transfer the call in this manner.

Some systems have attempted to solve the problems highlighted in the above illustrative Los Angeles-San Francisco scenario by adopting a protocol whereby calls are always setup through the home exchange and, instead of assigning the task of detecting that the roaming subscriber has not answered to the visited exchange, a timer is activated in the home exchange upon call set up and, if the roaming subscriber does not answer within a predetermined length of time, the home exchange will route the call to the voice mailbox assigned to the roaming subscriber. As explained below, however, this solution may be implemented only in a mobile switching center ("MSC") environment, but not efficiently in a home location register ("HLR") environment.

Most cellular radio networks today operate in an MSC environment wherein location and service profile data for each mobile subscriber are stored in his home exchange and updated from time to time as required. By contrast, in an HLR environment, location and service profile data are recorded and updated in the home HLR which is connected, and may serve the mobile subscribers assigned, to several exchanges. Unlike an exchange, however, an HLR has no voice transmission, reception or switching facilities, but is essentially a database from and to which information can be read and written. Possible reasons for a shift from an MSC environment to an HLR environment include limitations in the capacity of an exchange and optimization of administrative procedures for handling calls. For example, while only 64,000 mobile subscribers may be connected to a typical exchange at one time, an HLR may have the capacity to serve over 500,000 mobile subscribers.

Implementation of an HLR environment in cellular radio networks, either exclusively or in conjunction with an MSC environment, is expected to become widespread in the future. However, integrating a voice mail system in an HLR environment poses certain difficulties which do not arise in an MSC environment. In particular, because the HLR has no voice facilities, the voice mail equipment cannot be directly connected to the HLR. One solution to these difficulties is to connect the voice mail equipment to one exchange in the cellular network dedicated as a "pseudo-home" exchange and route all calls through the pseudo-home exchange. However, as will be readily understood by person skilled in the art, this solution breeds an inefficient and inflexible network. As discussed more fully below, the present invention provides for efficient delivery of calls to the voice mailboxes of mobile subscribers operating in both an MSC and an HLR environment.

SUMMARY OF THE INVENTION

The present invention includes a system and method for routing a call to auxiliary communications services equipment, such as voice mail, connected within a cellular radio network. The equipment may be connected to any arbitrary exchange in the network. According to the present invention, an incoming call to a mobile subscriber is routed to the nearest exchange in the network. The location of the exchange currently serving the mobile subscriber is obtained from the home exchange or HLR and the call is then routed from the nearest exchange to the serving exchange where the mobile subscriber is located.

If the mobile subscriber is unavailable and, therefore, the call cannot be completed, the serving exchange requests the nearest exchange to transfer the call. The nearest exchange queries the home exchange or HLR and receives an auxiliary communications services number which is passed from the arbitrary exchange. The number is used for routing the call through the PSTN to the arbitrary exchange which, in turn, mutes the call to the auxiliary communications services mail box of the mobile subscriber.

In one aspect, the system of the present invention includes a cellular radio network having a first exchange connected to a calling subscriber, a second exchange connected to a called subscriber and a third exchange connected to an auxiliary communications services mailbox for the called subscriber. A call is routed from the calling subscriber to the mailbox of the called subscriber by receiving the call at the first exchange, routing the call to the second exchange and detecting at the second exchange that the call cannot be completed to the called subscriber. A request to transfer the call is sent from the second exchange to the first exchange and then, in response thereto, a request for an auxiliary communications services number is sent to the third exchange. A number is generated at the third exchange, in response to the request, and then sent to the first exchange. The call is next routed from the first exchange to the third exchange using the auxiliary communications services number and then to the mailbox of the called subscriber.

In another aspect, the present invention includes a system for routing an incoming call intended for a mobile subscriber to auxiliary communications services equipment, such as voice mail equipment, in a cellular radio network by connecting the equipment to an arbitrary exchange in the network. An incoming call is routed to the nearest exchange in the network and then the exchange currently serving the mobile subscriber is located and the call routed to that exchange. If the call cannot be completed to the mobile subscriber at the serving exchange a transfer is requested and it is determined whether the subscriber has auxiliary communications service and an auxiliary communications services number is requested from the arbitrary exchange. The incoming call is then routed from the nearest exchange to the arbitrary exchange using the auxiliary communications services number and completed to the auxiliary communications services equipment.

BRIEF DESCRIPTION OF THE DRAWINGS

The present invention will be better understood and its numerous objects and advantages will become apparent to those skilled in the art by reference to the following drawings in which like numerals or numbers designate like objects.

DETAILED DESCRIPTION OF THE PREFERRED EMBODIMENT

Figure 1:
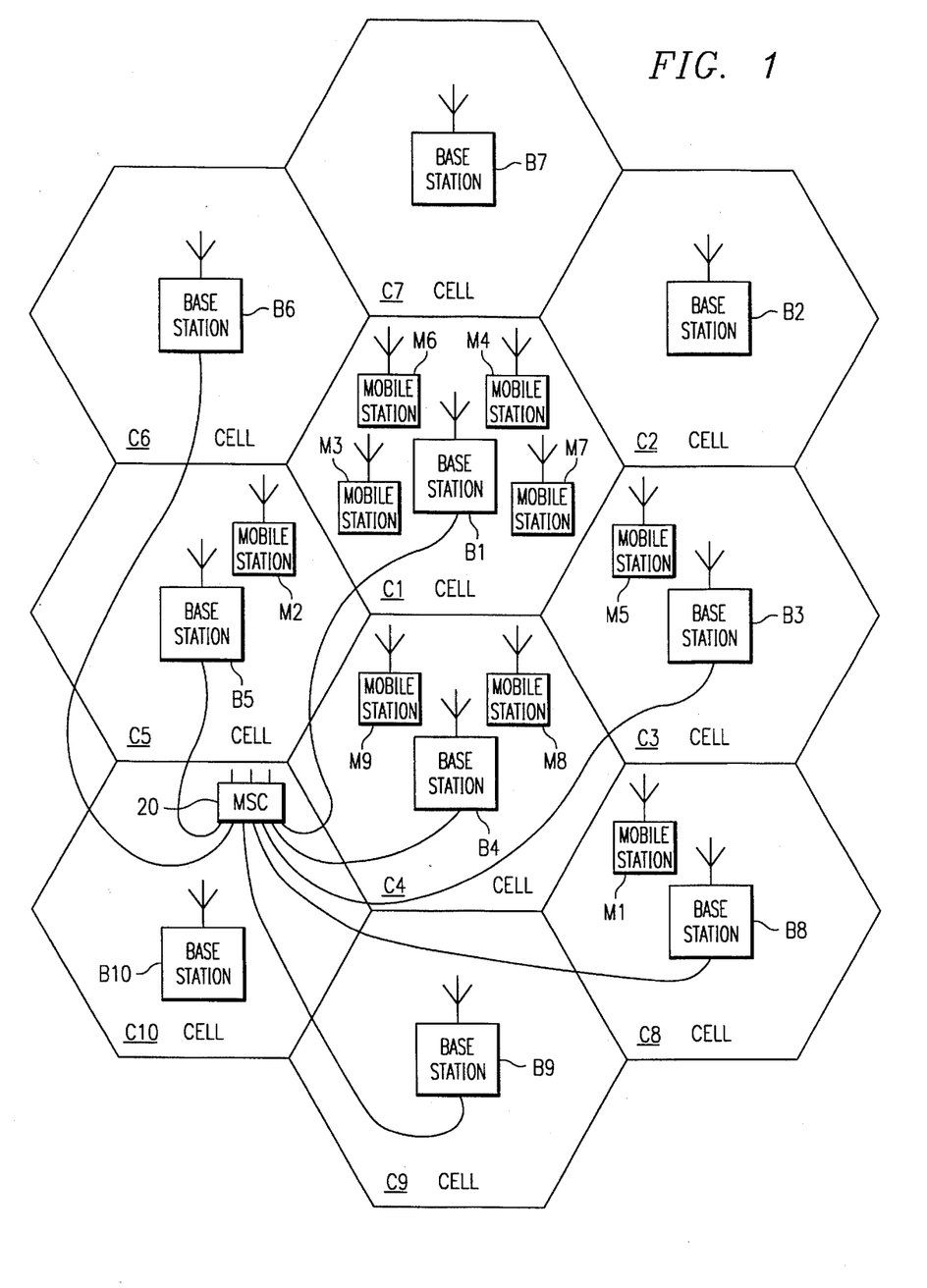
FIG. 1 is a pictorial representation of a cellular radio network including a single mobile switching center, a plurality of base stations and a plurality of mobile subscribers.

Referring first to FIG. 1, there is illustrated therein a conventional cellular radio communications system of a type to which the present invention generally pertains. In FIG. 1, an arbitrary geographic area may be seen divided into a plurality of contiguous radio coverage areas, or cells, C1–C10. While the system of FIG. 1 is shown to include only 10 cells, it should be clearly understood that, in practice, the number of cells may be much larger.

Associated with and located within each of the cells C1–C10 is a base station designated as a corresponding one of a plurality of base stations B1–B10. Each of the base stations B1–B10 includes a transmitter, a receiver and a controller as is well known in the art. In FIG. 1, the base stations B1–B10 are located at the center of the cells C1–C10, respectively, and are equipped with omni-directional antennas. However, in other configurations of the cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG. 1, a plurality of mobile stations M1–M9 may be found within the cells C1–C10. Again, only nine mobile stations are shown in FIG. 1 but it should be understood that the actual number of mobile stations may be much larger in practice and will invariably exceed the number of base stations. Moreover, while none of the mobile stations M1–M9 may be found in some of the cells C1–C10, the presence or absence of the mobile stations M1–M9 in any particular one of the cells C1–C10 should be understood to depend, in practice, on the individual desires of each of the mobile stations M1–M10 who may roam from one location in a cell to another or from one cell to an adjacent or neighboring cell.

Each of the cells C1–C10 is allocated a plurality of voice or speech channels and at least one data or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof.

Each of the mobile stations M1–M9 is capable of initiating or receiving a telephone call through one or more of the base stations B1–B10 and a mobile switching center MSC. The mobile switching center MSC is connected by communications links, e.g. cables, to each of the illustrative base stations B1–B10 and to the fixed public switching telephone network (PSTN), not shown, or a similar fixed network which my include an integrated system digital network (ISDN) facility. The relevant connections between the mobile switching center MSC and the base stations B1–B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and mobile subscribers, and to other mobile switching centers, via cable or radio links. In the discussion which follows, conventional communication links, e.g., cable or radio voice or data links, as applicable, are not specifically discussed, but are designated by the reference numeral 5 in the schematic block diagrams of FIGS. 2, 4, 6, 7.

Figures 2, 3:
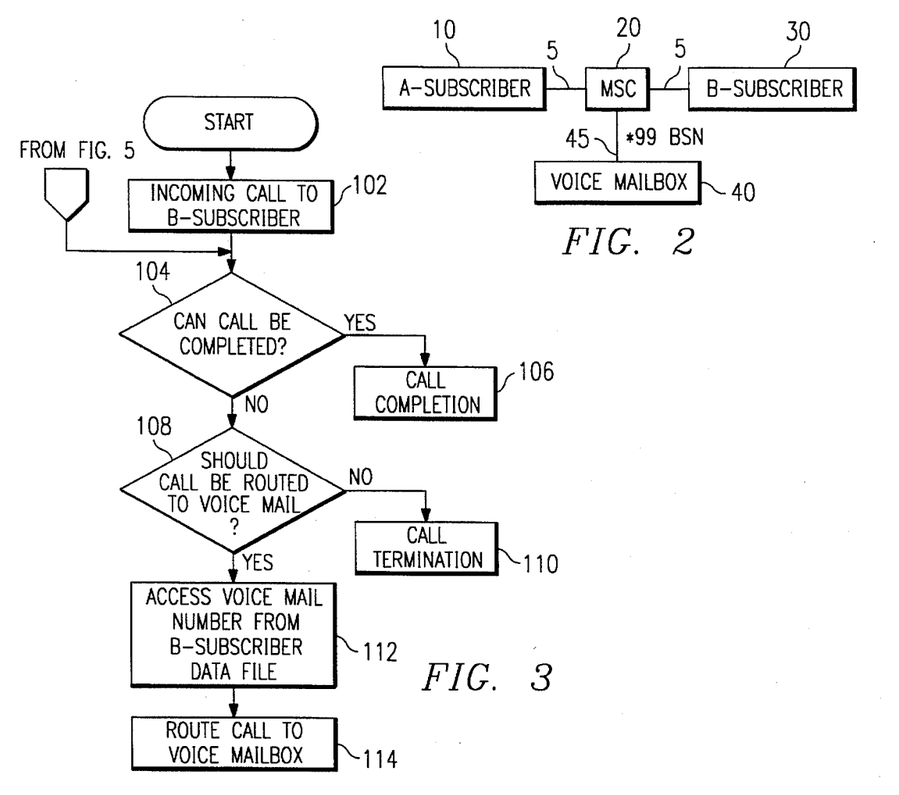
FIG. 2 is a schematic block diagram of an auxiliary communications services system such as voice mail which may be used in the network of FIG. 1.
FIG. 3 is a flow chart diagram which illustrates the operation of the voice mail system of FIG. 2.

Referring now to FIG. 2, a schematic block diagram of an auxiliary communications services system, such as voice mail, which may be used in the network of FIG. 1 may be seen. It should be understood that the present invention contemplates the routing of various auxiliary communications services within a cellular communications network. The presently most commonly available of such services, voice mail, will be used as an example auxiliary communications service to illustrate the principles of the invention. Voice mail equipment, labelled "VOICE MAILBOX" and designated by the reference number 40 in FIG. 2, is connected directly to the MSC of FIG. 1, designated by the reference number 20 in FIG. 2. The MSC 20 may, for example, set up an incoming call placed by an A-SUBSCRIBER 10, such as an ordinary PSTN subscriber, to a B-SUBSCRIBER 30, such as one of the mobile stations M1–M9. If the B-SUBSCRIBER 30 is unavailable, the MSC 20 will redirect the call to the VOICE MAILBOX 40 through dedicated trunks 45 using a dedicated voice mail number which will address the voice mailbox of the B-SUBSCRIBER 30. The dedicated voice mail number may be defined, for example, as *99BSN, where *99 is a prefix and BSN is the telephone number of the B-SUBSCRIBER 30.

Referring next to FIG. 3, a flow chart diagram which illustrates the operation of the voice mail system of FIG. 2 may now be seen. At step 102, the MSC 20 detects an incoming call from the A-SUBSCRIBER 10 to the B-SUBSCRIBER 30. At step 104, the MSC 20 determines whether the call can be completed to the B-SUBSCRIBER 30. If the B-SUBSCRIBER 30 is available, the call is completed at step 106 and a voice connection is established between the A-SUBSCRIBER 10 and the B-SUBSCRIBER 30. However, if the B-SUBSCRIBER 30 is unavailable because of a busy condition, page-no-response condition, ring-no-answer condition, do-not-disturb condition or other condition, the MSC 20, at step 108, checks the service profile of the B-SUBSCRIBER 30 and determines whether the call should be routed to voice mail. If the B-SUBSCRIBER 30 does not have voice mail service, normal call termination procedures are followed at step 110. However, if the B-SUBSCRIBER 30 has voice mail service, the MSC 20, at step 112, accesses the dedicated voice mail number of the B-SUBSCRIBER 30, e.g., *99BSN, and routes the call through dedicated trunks 45 to the VOICE MAILBOX 40 at step 114. The BSN is used by the VOICE MAILBOX 40 to identify the particular voice mailbox of the B-SUBSCRIBER 30.

Figure 4:
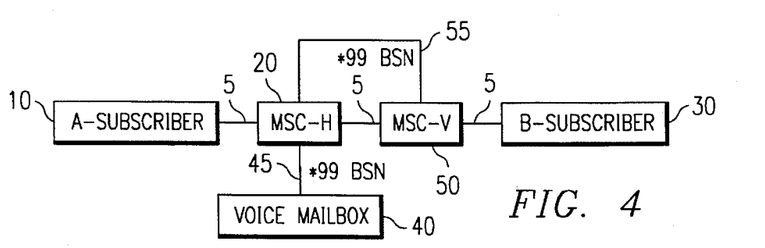
FIG. 4 is a schematic block diagram of a voice mail system which may be used in a cellular radio network including multiple exchanges and operating in an MSC environment.

Referring now to FIG. 4, a schematic block diagram of a voice mail system which may be used in a cellular radio network including multiple exchanges and operating in an MSC environment may be seen. For clarity, it may be assumed that the cellular radio network of FIG. 2 has expanded to include an additional MSC and that roaming services are now available. The MSC 20 of FIG. 2 has been designated as a home exchange MSC-H 20 and the additional MSC as a visited exchange MSC-V 50. It should be understood that the two exchanges shown in the block diagram of FIG. 4 are exemplary only and that many additional exchanges would conventionally be included in a cellular radio network. However, the two exchanges shown are sufficient for purposes of illustration.

In multiple exchange applications of the type shown in FIG. 4, the voice mail equipment is usually connected to the home exchange of a mobile subscriber. If the B-SUBSCRIBER 30, while roaming in the vicinity of the MSC-V 50, receives a call from the A-SUBSCRIBER 10, but does not answer, the call will be transferred to the VOICE MAILBOX 40 either from the MSC-H 20 through dedicated trunks 45 or from the MSC-V 50 through dedicated trunks 55 via the MSC-H 20. In the former instance, once the MSC-H 20 detects that the B-SUBSCRIBER 30 has not answered the call, the MSC-H 20 clears the call to the MSC-V 50 and diverts the call to the VOICE MAILBOX 40 as shown in FIG. 3. In the latter instance, the call is transferred as shown in FIG. 5.

Figure 5:
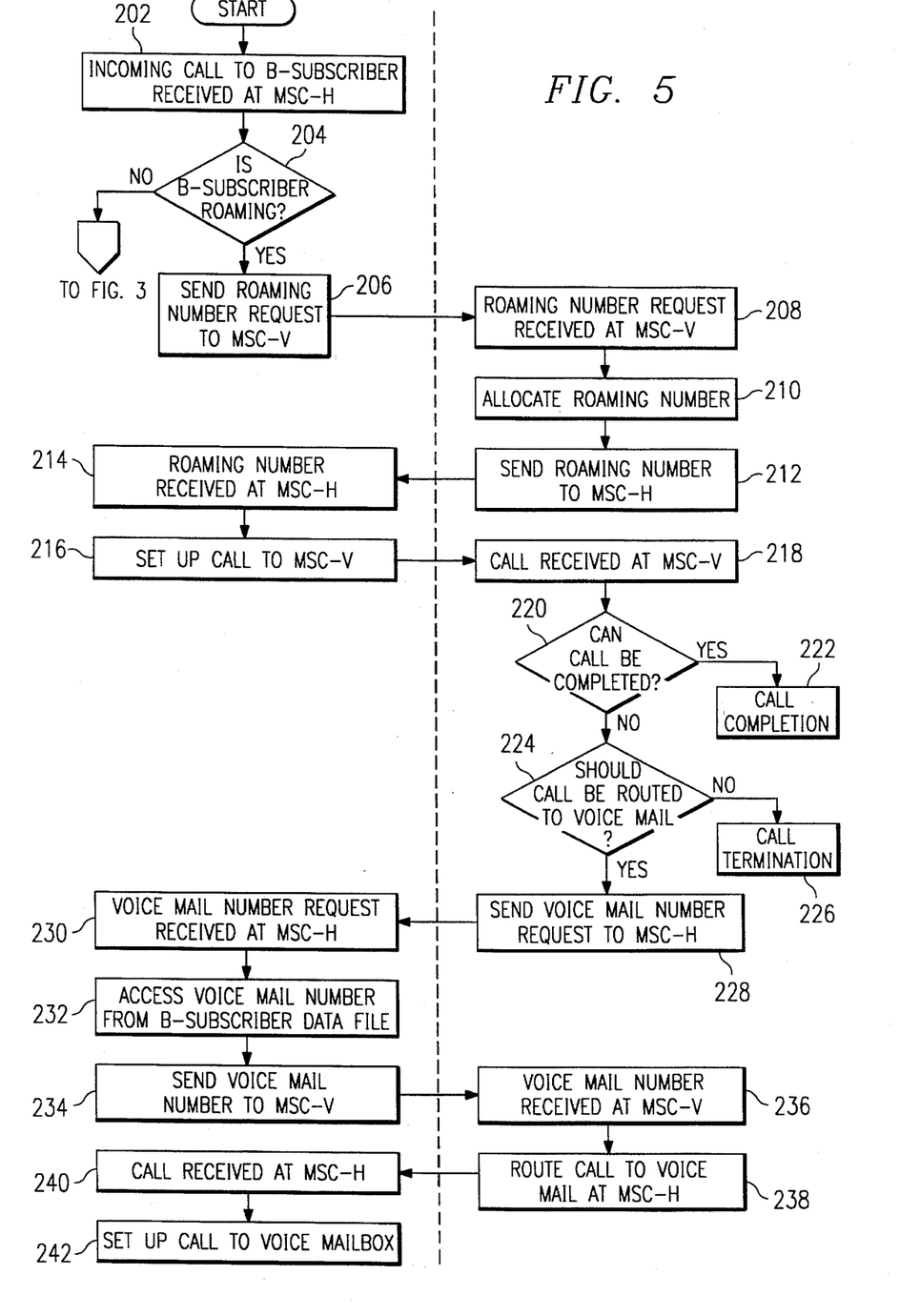
FIG. 5 is a flow chart diagram which illustrates the operation of the voice mail system of FIG. 4.

Referring now to FIG. 5, there is shown a flow chart diagram which illustrates the operation of the voice mail system of FIG. 4. The flow chart diagram of FIG. 5 sets forth the major steps which are involved in transferring a call from the MSC-V 50 to the VOICE MAILBOX 40 through dedicated trunks 55 via the MSC-H 20. The left half of FIG. 5, i.e., the portion left of the broken lines, shows those steps which take place at the MSC-H 20 and the right half of FIG. 5, i.e., the portion right of the broken lines, shows the steps which take place at the MSC-V 50. At step 202, the MSC 20 detects an incoming call from the A-SUBSCRIBER 10 to the B-SUBSCRIBER 30. At step 204, the MSC-H 20 determines whether the B-SUBSCRIBER 30 is roaming. If the B-SUBSCRIBER 30 is not roaming, i.e., is within the coverage area of the MSC-H 20, the call will be either completed to the B-SUBSCRIBER 30 or, if the B-SUBSCRIBER 30 is unavailable, routed to the VOICE MAILBOX 40 as shown in FIG. 3.

Assuming that the B-SUBSCRIBER 30 has roamed and is now registered with the MSC-V 50, at step 206, the MSC-H 20 will request a roaming number from the MSC-V 50 which can be used to route the call to the B-SUBSCRIBER 30. Upon receiving the roaming number request at step 208, the MSC-V 50 allocates a roaming number to the B-SUBSCRIBER 30 at step 210 and sends the roaming number to the MSC-H 20 at step 212. Upon receiving the roaming number at step 214, the MSC-H 20 sets up the call to the MSC-V 50 at step 216. Once the call is received by the MSC-V 50 at step 218, the MSC-V 50, at step 220, determines whether the call can be completed to the B-SUBSCRIBER 30. If the B-SUBSCRIBER 30 is available, the call is completed at step 222. However, if the B-SUBSCRIBER 30 is unavailable, the MSC-V 50 consults the service profile of the B-SUBSCRIBER 30 and determines, at step 224, whether the voice mail service is activated. If the B-SUBSCRIBER 30 does not have voice mail service activated, normal call termination procedures are followed at step 226.

Assuming that the call is eligible for voice mail treatment, at step 228, the MSC-V 50 requests a voice mail number from the MSC-H 20 which can be used to route the call to the VOICE MAILBOX 40. After receiving the voice mail number request at step 230, the MSC-H 20 accesses the voice mail number from the data file of the B-SUBSCRIBER 30 at step 232 and sends the voice mail number to the MSC-V 50 at step 234. Theoretically, the voice mail number may be a PSTN-recognized number, but as previously explained, is more likely to be a dedicated, non-PSTN-recognized number such as *99BSN. Once the voice mail number, for example, *99BSN, is received by the MSC-V 50 at step 236, the call is routed through the dedicated trunks 55 to the MSC-H 20 at step 238. The dedicated trunks 55 must be used because the voice mail number is assumed to be a non-PSTN-recognized number and, therefore, PSTN voice facilities cannot be used. The MSC-H 20 receives the call at step 240 and at step 242 sets up the call to the VOICE MAILBOX 40 which then uses the voice mail number to identify the particular voice mailbox of the B-SUBSCRIBER 30.

Figure 6:
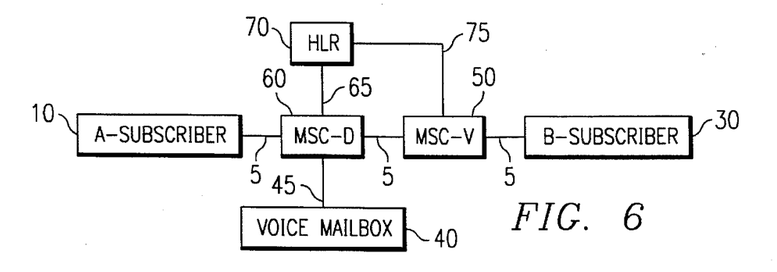
FIG. 6 is a schematic block diagram of a voice mail system which may be used in a cellular radio network operating in an HLR environment.

Referring now to FIG. 6, there is shown a schematic block diagram of a voice mail system which may be used in a cellular radio network operating in an HLR environment. As heretofore discussed, in an HLR environment, a home location register is used as a memory for location and service profile data associated with a large number of mobile subscribers which may be assigned to a number of different exchanges. In this aspect, the HLR performs some of the functions traditionally reserved for the home exchanges in the cellular radio network. The HLR, however, generally has no voice facilities and does not perform any of the switching functions normally associated with a home exchange. As a result, the voice mail equipment which has traditionally been connected to the home exchanges in an MSC environment cannot be similarly connected to the HLR in an HLR environment.

One approach to establishing a voice mail system in an HLR environment is to connect the voice mail equipment to an arbitrary exchange in the cellular network and to route all incoming calls to a mobile subscriber through that exchange which, in turn, can route the calls to the voice mailbox of the mobile subscriber as necessary. Such an exchange is designated as a dedicated exchange, MSC-D, and identified by the reference number 60 in FIG. 6. The MSC-D 60 is connected to an HLR 70 which contains location and service profile information for mobile subscribers such as the B-SUBSCRIBER 30. When the A-SUBSCRIBER 10 places a call to the B-SUBSCRIBER 30, the call is automatically routed to the MSC-D 60 which may not be, and usually is not, the nearest exchange to the A-SUBSCRIBER 10.

If, as in FIG. 4, the B-SUBSCRIBER 30 has roamed and was detected by the MSC-V 50, a location update message for the B-SUBSCRIBER 30 is sent from the MSC-V 50 to the HLR 70 via signalling path 75. When the call is received at the MSC-D 60, a location request message for the B-SUBSCRIBER 30 is sent from MSC-D 60 to the HLR 70 via signalling path 65 and the present location of the B-SUBSCRIBER 30 is obtained. A roaming number is requested and the call is then routed to the MSC-V 50 in substantially the same manner illustrated in FIG. 5. If the B-SUBSCRIBER 30 is unavailable, the MSC-V 50 uses a voice mail number to route the call to the VOICE MAILBOX 40 in accordance with the steps shown in FIG. 5. In the likely event that the voice mail number is a non-PSTN-recognized number, dedicated trunks (Pat shown in FIG. 6) must be used for voice mail routing between the MSC-V 50 and the MSC-D 60.

The requirement underlying the voice mail system depicted in FIG. 6 that all incoming calls be directed to the MSC-D 60 and that all diversions to the VOICE MAILBOX 40 be made from the MSC-D 60 leads to an inefficient and inflexible radio cellular network. Suppose, for example, that a mobile subscriber from Los Angeles roams to San Francisco. A call to the mobile subscriber which originates in San Francisco will be automatically routed to the dedicated exchange in Los Angeles, which will, in turn, route the call back to San Francisco where the mobile subscriber is presently located. Not only are network resources between Los Angeles and San Francisco unnecessarily occupied, but the costs of maintenance are also increased because every call to the mobile subscriber is directed to the dedicated exchange. A mechanism is, therefore, needed which, in the preceding example, would allow the call to be completed within San Francisco and not through Los Angeles. The present invention provides the desired efficiency and flexibility by allowing the implementation of interrogation call routing as described more fully below.

In an MSC environment implementing interrogation call routing, whenever a call is placed to a roaming subscriber, for example, by an ordinary PSTN subscriber, the call is routed to the nearest mobile exchange qualified as an entry into the cellular network. Such an entry exchange is referred to herein as an interrogation exchange. The interrogation exchange then requests call routing information from the called subscriber's home exchange. Upon receiving the routing request from the interrogation exchange, the home exchange generates call routing information by accessing from its memory the current registered location for the called roaming subscriber. Based on this information, the call is routed to the visited exchange indicated by the location registration data stored in the memory of the home exchange. Once the incoming call is received in the visited exchange, a page is broadcast by the visited exchange to the called mobile station. Upon receiving the page signal, the mobile station transmits a page response to the visited exchange and a voice connection may then be established on one of the voice channels.

As heretofore discussed, present voice mail systems are addressed by non-PSTN-recognized telephone numbers. In an MSC environment with automatic roaming capability dedicated trunks, such as the dedicated trunks 55 shown in FIG. 4, must be used to route incoming calls to the voice mail equipment connected to the home exchanges. On the other hand, the use of a voice mail system in an HLR environment, as discussed above, results in an approach to call routing which, in many respects, is the antithesis to interrogation call routing. Returning briefly to FIG. 6 and the accompanying discussion, it may be seen that every call must be muted through the MSC-D 60 which is often not the nearest exchange to the calling party. According to the present invention, however, the need to use dedicated trunks for voice mail routing is obviated, and the use of a voice mail system in an HLR environment is harmonized with the use of interrogation call routing.

Figure 7:
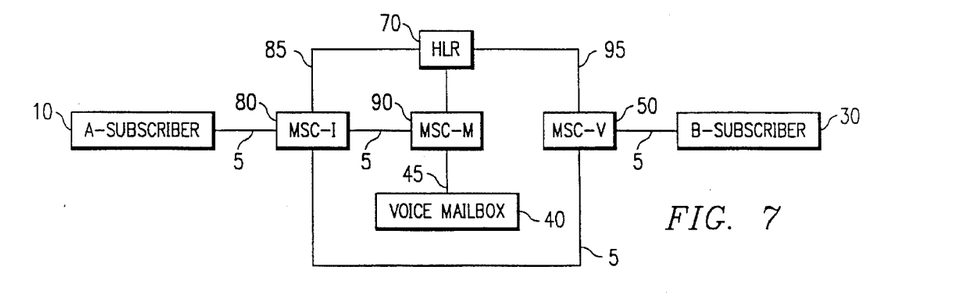
FIG. 7 is a schematic block diagram of a voice mail system which may be used in a cellular radio network operating in an HLR environment and configured in accordance with the teachings of the present invention.

Referring now to FIG. 7, a schematic block diagram of a voice mail system which may be used in a cellular radio network operating in an HLR environment and configured in accordance with the teachings of the present invention may be seen. The cellular radio network depicted in FIG. 7 implements the concept of interrogation call routing. Accordingly, whenever the A-SUBSCRIBER 10 places a call to the B-SUBSCRIBER 30, the call is routed to the nearest exchange designated as an interrogation exchange MSC-I and identified by the reference number 80 in FIG. 7. The MSC-I 80 interrogates the HLR 70 via signalling path 85 to determine the location of the B-SUBSCRIBER 30. If the location information contained in the HLR 70 has been updated via signalling path 95 to indicate that the B-SUBSCRIBER 30 is roaming in the vicinity of the MSC-V 50, the MSC-I 80 requests a roaming number from the MSC-V 50 and uses the roaming number to set-up the call to the MSC-V 50. The B-SUBSCRIBER 30 is paged by the MSC-V 50 and, upon a page response, a voice connection is established between the A-SUBSCRIBER 10 and the B-SUBSCRIBER 30.

However, if the B-SUBSCRIBER 30 is unavailable, the B-SUBSCRIBER 30 may wish the call to be diverted to his voice mailbox. According to the present invention, the voice mail equipment may be connected to any participating component in the cellular radio network, including any desired exchange selected by the network operator. Such an exchange is designated as a voice mail exchange MSC-M and identified by the reference number 90 in FIG. 7. When the MSC-V 50 detects that the call cannot be completed to the B-SUBSCRIBER 30, the MSC-V 50, instead of redirecting the call, requests the MSC-I 80 to transfer the call as appropriate. The MSC-I 80, in turn, requests service information for the B-SUBSCRIBER 30 from the HLR 70. The HLR 70 reads the service profile of the B-SUBSCRIBER 30 and determines that the voice mailbox of the B-SUBSCRIBER 30 is connected to the MSC-M 90. The HLR 70 then obtains a PSTN-recognized voice mail number from the MSC-M 90 and relays the voice mail number to the MSC-I 80 which uses it to set-up the call through the PSTN to the Voice Mailbox 40 connected to the MSC-M 90. While the exchange containing the voice mailbox is here shown as an MSC, i.e., MSC-M 90, it should be understood that that exchange may be any type of switch and need not necessarily have cellular capabilities.

Figure 8:
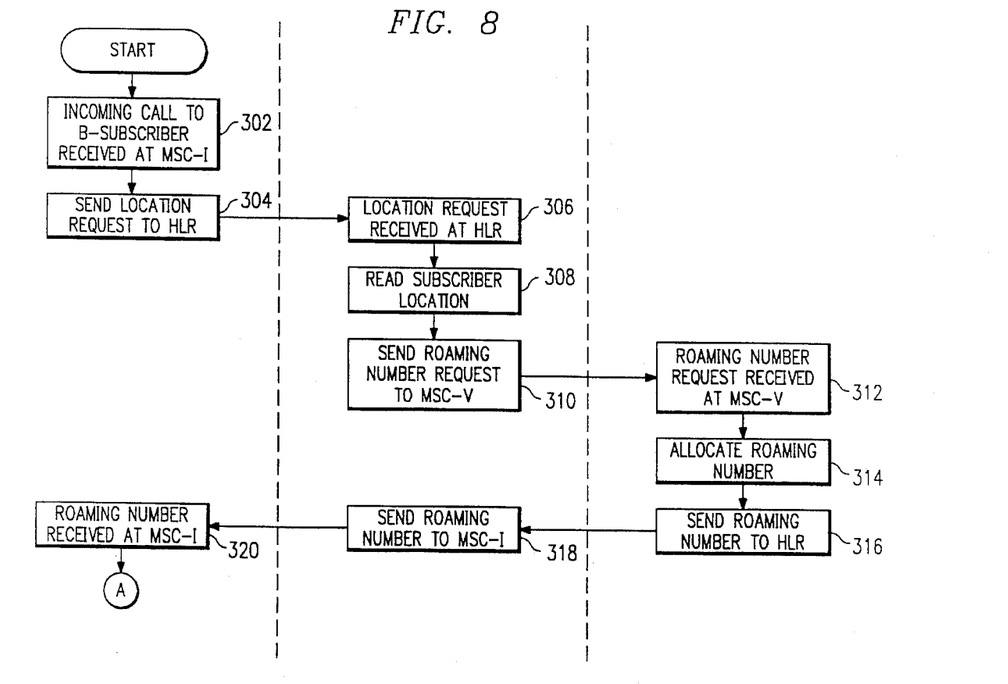
FIGS. 8–12 are flaw chart diagrams which illustrate the operation of the voice mail system of FIG. 7.
Figure 9:
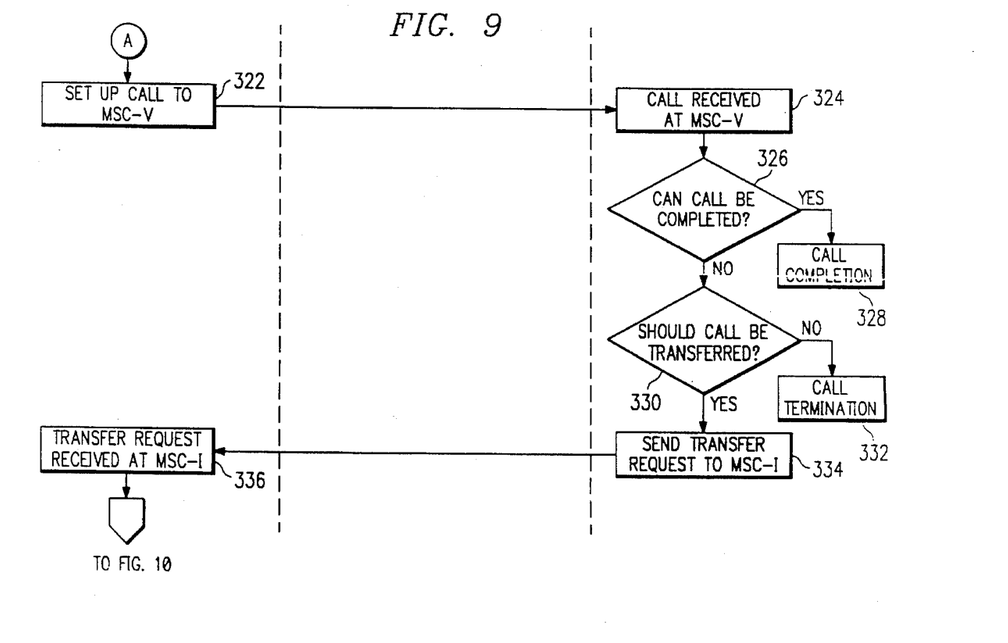
Figure 10:
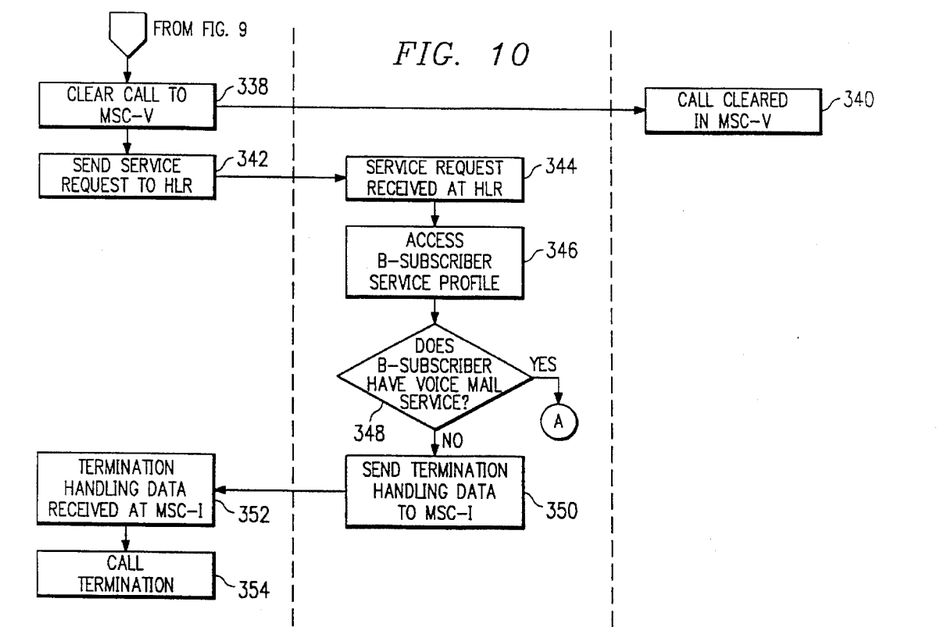
Figure 11:
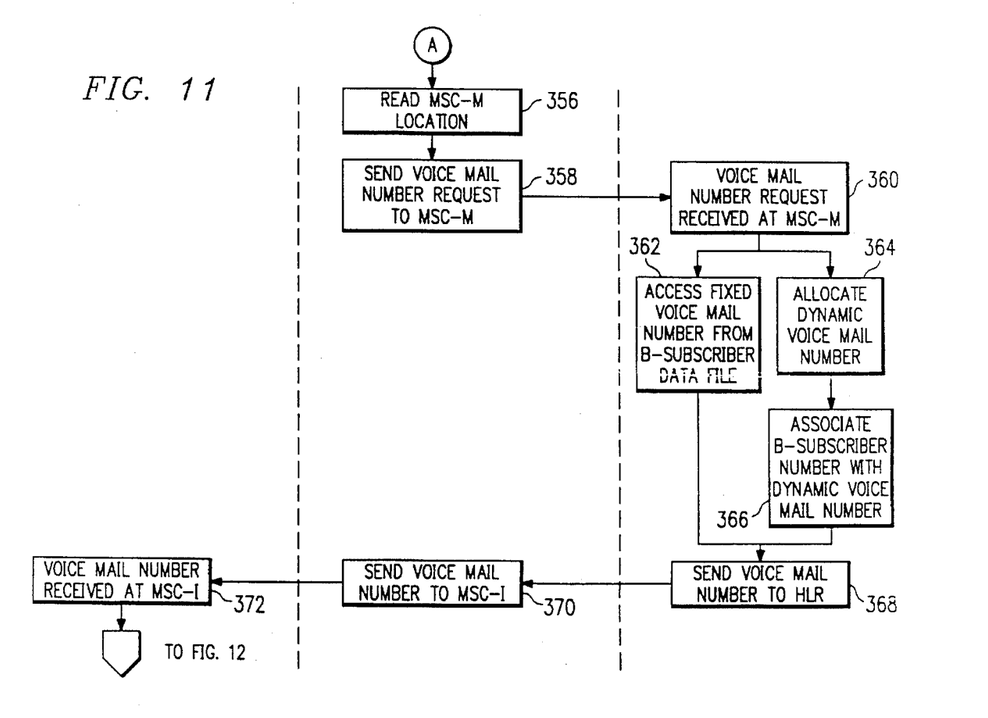
Figure 12:
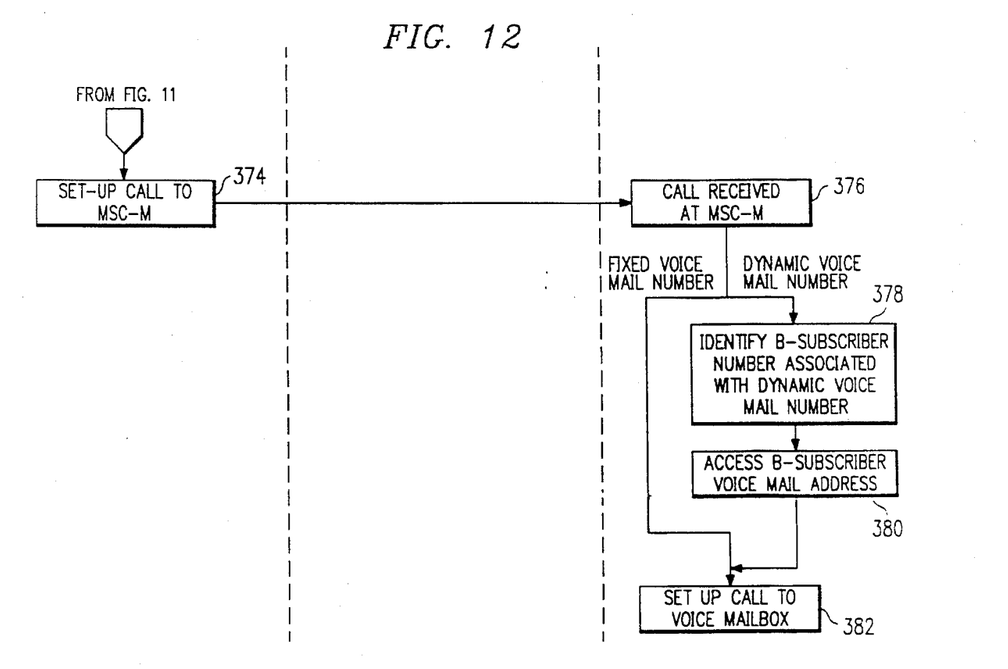

Referring now to FIGS. 8–12, there is shown therein a series of flow chart diagrams which, taken together, illustrate the operation of the voice mail system of FIG. 7 in greater detail. For clarity, each of FIGS. 8–12 is divided into three parts separated by broken lines. The leftmost and middle parts of FIGS. 8–12 show the events which take place at the MSC-I 80 and the HLR 70, respectively. However, while the rightmost parts of FIGS. 8–10 show the events which take place at the MSC-V 50, the rightmost parts of FIGS. 11–12 show the events which take place at the MSC-M 90.

At step 302 of FIG. 8, an incoming call from the A-SUBSCRIBER 10 to the B-SUBSCRIBER 30 is received at the MSC-I 80, i.e., the nearest exchange to the A-SUBSCRIBER 10. At step 304, the MSC-I 80 sends a location request for the B-SUBSCRIBER 30 to the HLR 70. The HLR 70 receives the location request at step 306 and reads the current location of the B-SUBSCRIBER 30 from memory at step 308. The HLR 70 determines that the B-SUBSCRIBER 30 is roaming in the vicinity of the MSC-V 50 and sends a roaming number request to the MSC-V 50 at step 310. The roaming number request is received by the MSC-V 50 at step 312 and a roaming number is allocated to the B-SUBSCRIBER 30 at step 314. At step 316, the MSC-V 50 sends the roaming number to the HLR 70 which, in turn, sends the roaming number to the MSC-I 80 at step 318. The MSC-I 80 receives the roaming number at step 320 and is now in position to set-up the call to the MSC-V 50 which is currently serving the B-SUBSCRIBER 30.

At step 322 in FIG. 9, the MSC-I 80 sets-up the call to the MSC-V 50 and the call is received by the MSC-V 50 at step 324. At step 326, the MSC-V 50 determines whether the call can be completed to the B-SUBSCRIBER 30. If the B-SUBSCRIBER 30 is available, the call is completed at step 328. However, if the B-SUBSCRIBER 30 is unavailable, the MSC-V 50 determines, at step 330, whether the call should be transferred or terminated. If the B-SUBSCRIBER 30 does not, for example, have call waiting, call forwarding, or voice mail service, the call is terminated and the A-SUBSCRIBER 10 is provided with a busy tone, recorded announcement, or similar call termination treatment at step 332. However, if the call is to be transferred, the MSC-V 50, at step 334, sends a transfer request to the MSC-I 80 which receives the transfer request at step 336.

At step 338 in FIG. 10, the MSC-I 80 clears the speech path to the MSC-V 50 and, at step 340, the portion of the call in the MSC-V 50 is cleared. At step 342, the MSC-I 80 sends a service request to the HLR 70 in order to receive instructions on how to handle the call. Upon receiving the service request at step 344, the HLR 70 accesses the service profile of the B-SUBSCRIBER 30 at step 346 and determines, at step 348, whether the B-SUBSCRIBER 30 has voice mail service activated. If the B-SUBSCRIBER 30 does not have voice mail service, the HLR 70, at step 350, sends termination handling data to the MSC-I 80. In accordance with the termination handling data received by the MSC-I 80 at step 352, the call is terminated at step 354.

If, on the other hand, the HLR 70 determines at step 348 that the B-SUBSCRIBER 30 has voice mail service activated, the HLR 70, at step 356 in FIG. 11, reads the location of the voice mailbox of the B-SUBSCRIBER 30 and determines that the VOICE MAILBOX 40 is connected to the MSC-M 90. At step 358, the HLR 70 sends a voice mail number request to the MSC-M 90. The voice mail number request may be contained in a message which also includes, for example, the mobile identification number of the B-SUBSCRIBER 30, or similar indicia of the identity of the B-SUBSCRIBER 30. Once the voice mail number request is received by the MSC-M 90 at step 360, the number and identity of the B-SUBSCRIBER 30 are stored in memory and a PSTN-recognized voice mail number for the B-SUBSCRIBER 30 is obtained or generated in one of two possible ways. The MSC-M 90 may, as specifically shown by step 362, access a fixed voice mail number for the B-SUBSCRIBER 30 from its data files. In such instance, it is assumed that each mobile subscriber in the cellular radio network is assigned both a permanent directory telephone number and, also, a permanent PSTN-recognized voice mail number which can be used to set-up a call to the voice mailbox of the mobile subscriber. However, to minimize the number of telephone numbers which must be leased from the local phone company, dynamic or temporary voice mail numbers may be used, as illustrated by steps 364 and 366 in FIG. 11.

At step 364, the MSC-M 90 searches through a list of PSTN-recognized voice mail numbers assigned, not to the mobile subscribers served by the VOICE MAILBOX 40, but to the MSC-M 90, and selects the first idle, i.e., unused, voice mail number which may be allocated to the instant voice mail number request. The required size of the list will be a function of the number of voice mail number requests which are expected to be simultaneously received by the MSC-M 90 at any particular moment, but, in any event, will be much smaller than the number of mobile subscribers served by the VOICE MAILBOX 40. The allocation of voice mail numbers by the MSC-M 90 may be accomplished in a manner similar to that disclosed for the allocation of roaming numbers by a visited exchange in copending U.S. patent application Ser. No. 07/490,480, entitled "Dynamic Allocation of Roamer Routing Numbers System and Method," filed on Mar. 8, 1990 and assigned to the assignee of the present invention and incorporated by reference herein.

At step 366, the MSC-M 90 associates or connects the number of the B-SUBSCRIBER 30 with the dynamically allocated voice mail number. Such an association or connection, i.e., an electronic "bridge", between the number of the B-SUBSCRIBER 30 and the dynamically allocated voice mail number is needed because, unlike the case where a fixed voice mail number is used, the dynamically allocated voice mail number is an arbitrary telephone number which is selected merely on the basis of availability. At step 368, the voice mail number, whether fixed or dynamic, is sent by the MSC-M 90 to the HLR 70 which, at step 370, forwards the voice mail number to the MSC-I 80 and the voice mail number is received by the MSC-I 80 at step 372.

At step 374 in FIG. 12, the MSC-I 80 uses the PSTN-recognized voice mail number returned by the HLR 70 to set-up the call through the PSTN to the MSC-M 90. At step 376, the MSC-M 90 receives the call and, where the voice mail number is a fixed PSTN-recognized number assigned to the B-SUBSCRIBER 30, the MSC-M 90, at step 382, sets up the call to the VOICE MAILBOX 40 which then uses the voice mail number to identify the particular voice mailbox of the B-SUBSCRIBER 30. Where, on the other hand, the voice mail number is a dynamic voice mail number allocated by the MSC-M 90 from an arbitrary list of PSTN-recognized numbers, the MSC-M 90, at step 378, analyses the call and identifies the number of the B-SUBSCRIBER 30 previously associated with the dynamic voice mail number which may, thereafter, be released for reuse. At step 380, the MSC-M 90 accesses the voice mail address of the B-SUBSCRIBER 30 and, at step 382, sets up the call to the VOICE MAILBOX 40 which then uses the voice mail address to identify the particular voice mailbox of the B-SUBSCRIBER 30. The mobile station number of the B-subscriber can be used as the voice mail address.

From the foregoing description, it may be seen that two salient features of the present invention are the efficient routing of calls in a cellular radio network which offers voice mail service to mobile subscribers, and the use of PSTN-recognized telephone numbers to route calls to the voice mailboxes of these mobile subscribers. Other features of the present invention include the ability of the cellular operator to connect voice mail equipment to any exchange in the network and to forego the use of PSTN-recognized numbers for all voice mailboxes. The present invention is also particularly suited for implementation in an HLR environment where the voice mailboxes cannot be connected to the home exchanges.

While the foregoing description shows only certain embodiments of the present invention, those skilled in the art will recognize that many modifications and variations may be made without departing substantially from the spirit and scope of the present invention. Accordingly, it should be clearly understood that the form of the invention described herein is exemplary only and is not intended as a limitation on the scope or coverage of the present invention.

What is claimed is:

1. In a cellular radio network including a first exchange connected to a calling subscriber, a second exchange connected to a called subscriber and a third exchange connected to said first exchange through a public switched telephone network and to an auxiliary communications services mailbox for said called subscriber, a method for routing a call from said calling subscriber to said auxiliary communications services mailbox of said called subscriber comprising the steps of:

receiving said call at said first exchange;

routing said call to said second exchange;

directing said call to said called subscriber;

detecting at said second exchange that said call cannot be completed to said called subscriber;

sending from said second exchange to said first exchange a request to transfer said call;

sending to said third exchange via said cellular radio network in response to said request to transfer a request for an auxiliary communications services number recognizable by said public switched telephone network;

sending an auxiliary communications services number from said third exchange to said first exchange; and routing said call from said first exchange to the auxiliary communications services mailbox of the called subscriber connected to said third exchange via said public switched telephone network.

2. A method according to claim 1 wherein said step of routing said call to said second exchange includes the steps of:

sending to said second exchange a request for a roaming number;

allocating a roaming number to said called subscriber; and sending said roaming number to said first exchange for use in routing said call to said second exchange.

3. A method according to claim 1 wherein said step of detecting at said second exchange that said call cannot be completed to said called subscriber includes the steps of:

paging said called subscriber; and detecting that said called subscriber does not respond to said paging.

4. A method according to claim 1 wherein said step of detecting at said second exchange that said call cannot be completed to said called subscriber includes the steps of:

detecting that said called subscriber is busy.

5. A method according to claim 1 wherein said step of sending an auxiliary communications services number from said third exchange to said first exchange includes generating said auxiliary communications services number at said third exchange by accessing a telephone number assigned to said auxiliary communications services mailbox of said called subscriber.

6. A method according to claim 5 wherein said step of generating said auxiliary communications number at said third exchange includes the steps of:

selecting an idle telephone number from a list of telephone numbers;

allocating said telephone number to said request for an auxiliary communications service number; and associating said telephone number with said called subscriber.

7. A method according to claim 6 wherein said auxiliary communications services is voice mail and said step of routing said call from said third exchange to the voice mailbox of said called subscriber includes the steps of:

identifying the called subscriber associated with said telephone number;

accessing the address of said voice mailbox of said called subscriber; and routing the call from said third exchange to said voice mailbox indicated by said address.

8. In a cellular radio network including a first exchange connected to a calling subscriber, a second exchange connected to a called subscriber and a third exchange connected to said first exchange through a public switched telephone network and to an auxiliary communications services mailbox for said called subscriber, a system for routing a call from said calling subscriber to said auxiliary communications services mailbox of said called subscriber comprising:

means for receiving said call at said first exchange;

means for routing said call to said second exchange;

means for directing said call to said called subscriber;

means for detecting at said second exchange that said call cannot be completed to said called subscriber:

means for sending from said second exchange to said first exchange a request to transfer said call;

means for sending to said third exchange via said cellular radio network in response to said request to transfer a request for an auxiliary communications services number recognized by said public switched telephone network;

means for sending an auxiliary communications services number from said third exchange to said first exchange; and means for routing said call from said first exchange to the auxiliary communications mailbox of the called subscriber connected to said third exchange via said public switched telephone network.

9. A system according to claim 8 wherein said means for routing said call to said second exchange includes:

means for sending to said second exchange a request for a roaming number;

means for allocating a roaming number to said called subscriber; and means for sending said roaming number to said first exchange for use in routing said call to said second exchange.

10. A system according to claim 8 wherein said means for detecting at said second exchange that said call cannot be completed to said called subscriber includes:

means for paging said called subscriber; and means for detecting that said called subscriber does not respond to said paging.

11. A system according to claim 8 wherein said means for detecting at said second exchange that said call cannot be completed to said called subscriber includes:

means for detecting that said called subscriber is busy.

12. A system according to claim 8 wherein said means for sending an auxiliary communications services number from said third exchange to said first exchange includes means for generating said auxiliary, communications services number at said third exchange by accessing a telephone number assigned to said auxiliary- communications services mailbox of said called subscriber.

13. A system according to claim 12 wherein said means for generating said auxiliary communications services number at said third exchange includes:

means for selecting an idle telephone number from a list of telephone numbers;

means for allocating said idle telephone number to said request for an auxiliary communications services number; and means for associating said idle telephone number with said called subscriber.

14. A system according to claim 13 wherein said auxiliary communications services is voice mail and the means for routing said call from said third exchange to the voice mailbox of said called subscriber includes:

means for identifying the called subscriber associated with said telephone number;

means for accessing the address of said voice mailbox of said called subscriber; and means for routing the call from said third exchange to said voice mailbox indicated by said address.

15. A method for routing an incoming call intended for a mobile subscriber to an auxiliary communications services equipment in a cellular radio network comprising the steps of:

connecting said auxiliary communications services equipment to a selected exchange in said cellular radio network;

routing said incoming call to the nearest exchange in said cellular radio network;

locating the exchange currently serving said mobile subscriber;

routing the call from said nearest exchange to said serving exchange;

directing the call from said serving exchange to said mobile subscriber;

detecting that said incoming call cannot be completed to said mobile subscriber;

requesting a transfer of said incoming call from said serving exchange;

determining whether said mobile subscriber has auxiliary communications services;

requesting an auxiliary communications services number from said selected exchange;

routing said incoming call from said nearest exchange to said selected exchange using said auxiliary communications services number; and routing said incoming call from said selected exchange to said auxiliary communications services equipment.

16. A method according to claim 15 wherein said step of locating the exchange currently serving said mobile subscriber includes:

sending a location request to a home location register containing location and service information for said mobile subscriber;

reading the location of said mobile subscriber from the memory of said home location register;

sending a roaming number request to said serving exchange;

allocating to said roaming number request a roaming number provided by said serving exchange;

sending said roaming number from said serving exchange to said home location register; and sending said roaming number from said home location register to said nearest exchange for use in routing said incoming call from said nearest exchange to said serving exchange.

17. A method according to claim 16 wherein said step of requesting a transfer of said incoming call from said serving exchange includes the step of sending a transfer request from said serving exchange to said nearest exchange.

18. A method according to claim 17 wherein said step of determining whether said mobile subscriber has auxiliary communications services includes the steps of:

sending a service request from said nearest exchange to said home location register in response to said transfer request;

accessing the service profile of said mobile subscriber from the memory of said home location register in response to said service request; and reading the location of said arbitrary exchange to which said auxiliary communications services equipment is connected from the memory of said home location register.

19. A method according to claim 18 wherein said step of requesting a telephone number from said arbitrary exchange includes the step of sending an auxiliary communications services number request from said home location register to said selected exchange.

20. A method according to claim 19 wherein said step of routing said incoming call from said nearest exchange to said selected exchange using said auxiliary communications services number includes the steps of:

generating said auxiliary communications services number at said selected exchange;

sending said auxiliary communications services number from said selected exchange to said home location register; and sending said auxiliary, communications services number from said home location register to said nearest exchange for use in routing said incoming call from said nearest exchange to said selected exchange.

21. A method according to claim 20 wherein said step of generating said auxiliary communications services number at said selected exchange includes the steps of:

selecting an idle telephone number from a list of telephone numbers;

allocating said idle telephone number to said auxiliary communications services number request; and associating said auxiliary communications services number with said mobile subscriber.

22. A method according to claim 21 wherein said auxiliary communications services is voice mail and said step of routing said incoming call from said selected exchange to voice mail equipment includes the steps of:

identifying said mobile subscriber associated with voice mail number;

accessing the address of the voice mailbox in said voice mail equipment assigned to said mobile subscriber; and routing the call from said arbitrary exchange to said voice mailbox indicated by said address.

23. A system for routing an incoming call intended for a mobile subscriber to an auxiliary communications services equipment in a cellular radio network comprising:

means for connecting voice mail equipment to a selected exchange in said cellular radio network;

means for routing said incoming call to the nearest exchange in said cellular radio network;

means for locating the exchange currently serving said mobile subscriber;

means for routing the call from said nearest exchange to said serving exchange;

means for directing the call from said serving exchange to said mobile subscriber;

means for detecting that said incoming call cannot be completed to said mobile subscriber;

means for requesting a transfer of said incoming call from said serving exchange;

means for determining whether said mobile subscriber has voice mail service;

means for requesting an auxiliary communications services number from said selected exchange;

means for routing said incoming call from said nearest exchange to said selected exchange using said auxiliary communications services number; and means for routing said incoming call from said selected exchange to said auxiliary communications services equipment.

24. A system according to claim 23 wherein said means for locating the exchange currently serving said mobile subscriber includes:

means for sensing a location request to a home location register containing location and service information for said mobile subscriber;

means for reading the location of said mobile subscriber from the memory of said home location register;

means for sending a roaming number request to said serving exchange;

means for allocating to said roaming number request a roaming number provided by said serving exchange;

means for sending said roaming number from said serving exchange to said home location register; and means for sending said roaming number from said home location register to said nearest exchange for use in routing said incoming call from said nearest exchange to said serving exchange.

25. A system according to claim 23 wherein said means for requesting a transfer of said incoming call from said serving exchange includes means for sending a transfer request from said serving exchange to said nearest exchange.

26. A system according to claim 23 wherein said means for determining whether said mobile subscriber has auxiliary communications services includes:

means for sending a service request from said nearest exchange to said home location register in response to said transfer request;

means for accessing the service profile of said mobile subscriber from the memory of said home location register in response to said service request; and means for reading the location of said selected exchange to which said auxiliary communications services equipment is connected from the memory of said home location register.

27. A system according to claim 23 wherein said means for requesting a telephone number from said selected exchange includes means for sending an auxiliary communications services number request from said home location register to said selected exchange.

28. A system according to claim 23 wherein said means for routing said incoming call from said nearest exchange to said selected exchange using said auxiliary communications services number includes:

means for generating said auxiliary communications services number at said selected exchange;

means for sending said auxiliary communications services number from said selected exchange to said home location register; and means for sending a voice mail number from said home location register to said nearest exchange for use in routing said incoming call from said nearest exchange to said selected exchange.

29. A system according to claim 28 wherein said means for generating said auxiliary communications services number at said selected exchange includes:

means for selecting an idle telephone number from a list of telephone numbers;

means for allocating said idle telephone number to said auxiliary communications number request; and means for associating said auxiliary communications number with said mobile subscriber.

30. A system according to claim 23 wherein said auxiliary communications services is voice mail and said means for routing said incoming call from said selected exchange to voice mail equipment includes:

means for identifying said mobile subscriber associated with a voice mail number;

means for accessing the address of the voice mailbox in said voice mail equipment assigned to said mobile subscriber; and means for routing the call from said selected exchange to said voice mailbox indicated by said address.

* * * * *

UNITED STATES PATENT AND TRADEMARK OFFICE
CERTIFICATE OF CORRECTION

PATENT NO. : 5,506,888
DATED : Apr. 9, 1996
INVENTOR(S) : Hayes et al.

It is certified that error appears in the above-indentified patent and that said Letters Patent is hereby corrected as shown below:

| | |
|---|---|
| Column 1, line 56 | Replace "user s" <br> With --user's-- |
| Column 2, line 21 | Replace "subscriber s" <br> With --subscriber's-- |
| Column 2, line 59 | Replace "subscriber s" <br> With --subscriber's-- |
| Column 2, line 61 | Replace "subscriber s" <br> With --subscriber's-- |
| Column 3, line 12 | Replace "system" <br> With --system,-- |
| Column 4, line 52 | Replace "became," <br> With --because,-- |
| Column 5, line 39 | Replace "Lee" <br> With --Los-- |
| Column 6, line 25 | Replace "person" <br> With --persons-- |

UNITED STATES PATENT AND TRADEMARK OFFICE
CERTIFICATE OF CORRECTION

PATENT NO.   : 5,506,888
DATED        : Apr. 9, 1996
INVENTOR(S)  : Hayes et al.

It is certified that error appears in the above-indentified patent and that said Letters Patent is hereby corrected as shown below:

| | |
|---|---|
| Column 6, line 53 | Replace "mutes" With --routes-- |
| Column 7, line 54 | Replace "flaw" With --flow-- |
| Column 8, line 50 | Replace "my" With --may-- |
| Column 11, line 42 | Replace "(Pat" With --(not-- |
| Column 12, line 29 | Replace "muted" With --routed-- |
| Column 19, line 55 | Replace "sensing" With --sending-- |

Signed and Sealed this

Second Day of December, 1997

Attest:

BRUCE LEHMAN

Attesting Officer

Commissioner of Patents and Trademarks